United States Patent [19]
Myers

[11] Patent Number: 4,535,147
[45] Date of Patent: Aug. 13, 1985

[54] PHOSPHAZENE MODIFIED AMINE TERMINATED POLYMERS AND METHOD

[75] Inventor: Ronald E. Myers, Strongsville, Ohio

[73] Assignee: The B. F. Goodrich Company, New York, N.Y.

[21] Appl. No.: 629,281

[22] Filed: Jul. 9, 1984

[51] Int. Cl.$^3$ .............................................. C08G 69/26
[52] U.S. Cl. .................................... 528/321; 528/271; 528/332; 528/336; 528/337; 528/363; 528/392; 528/399
[58] Field of Search ............... 528/321, 363, 271, 392, 528/399, 337, 336, 332

[56] References Cited

U.S. PATENT DOCUMENTS 4,260,700  4/1981  Cassutt et al. ...................... 525/113

FOREIGN PATENT DOCUMENTS 52-101293  8/1977  Japan .

OTHER PUBLICATIONS

Product literature, HYCAR Elastomers B. F. Goodrich Co., 1976.
Phosphonitrilic Chloride as Activator of Carboxylic Acids, Caglioti et al, "Jur. of Organic Chem." vol. 53, No. 7, pp. 2979–2981, (1968).
Crosslinking of Hydroxyl–Terminated Liquid Polybutadiene with Trimers and Tetramers of Phosphonitrilic Chloride, Yamashita, et al.
"Nippon Gomu Kyokaishi", vol. 50, No. 3, pp. 204–208, (1977).

*Primary Examiner*—Harold D. Anderson
*Attorney, Agent, or Firm*—Woodrow W. Ban

[57] ABSTRACT

A reaction product of a phosphazene and an amine terminated reactive liquid polymer. The phosphazene and the reactive liquid polymer are combined under agitation to produce a cured, cross-linked, reactive liquid polymer including bonded phosphazene groups providing a desirable elastomeric performance over a broad range of temperatures including temperatures substantially below freezing.

14 Claims, No Drawings

PHOSPHAZENE MODIFIED AMINE TERMINATED POLYMERS AND METHOD

FIELD OF THE INVENTION

This invention relates to so-called reactive liquid polymers and more particularly to amine terminated reactive liquid polymers. More specifically, this invention relates to a composition of matter that is a reaction product between a phosphazene and an amine terminated reactive liquid polymer together with a method for making such a composition of matter.

BACKGROUND OF THE INVENTION

Reactive liquid polymers are generally well known in industry. Typically such polymers include a polymeric backbone comprising primarly carbon to carbon bond and one or more terminal groups that may provide chemically reactive functionality. In addition, pendant groups that may provide reactive functionality may be present along the backbone. HYCAR ® reactive liquid polymers manufactured by The BFGoodrich Company of Akron, Ohio are typical of such reactive liquid polymers.

Typically such liquid polymers are in an actual liquid state at or below conventional room temperatures. Occasionally, these materials may be semi-solid at room temperature but in a liquid form at temperatures below 200° C. Owing to a termination group that may provide reactive or functional capabilities, these reactive liquid polymers tend to provide a mechanism for introducing a rubbery characteristic into compounds not otherwise demonstrating elastomeric properties.

So, for example, amine terminated butadiene/acrylonitrile liquid polymer (HYCAR ATBN 1300×16) may be introduced into an epoxy system to provide flexibility. Formulations of ATBN polymer with thermoplastic urethanes, castable elastomers, EPDM, and blended polymers find utility in providing desirable low impact characteristics in paint and primers used at temperatures substantially below 0° F. ATBN polymers introduced into phenolic paint resins can assist in providing enhanced elongation characteristics in a finished phenolic paint coating. Reactive liquid polymers can find utility in the formulation of sealants where curing is desirable at room temperatures. Typically such a room temperature cure employs a epoxy resin as a curing agent. Systems of epoxy cured amine terminated reactive liquid polymers have found acceptance in applications such as underwater curable coatings.

Reactive liquid polymers may terminate in other than an amine group. For example, reactive liquid polymers may include terminal carboxylate, hydroxyl or vinyl functional groups or functional precursers. As might be expected, the nature of the reactivity of the reactive liquid polymer is substantially dependent upon the nature of the terminal entity.

Phosphazene is a well known compound comprising phosphorus and nitrogen and generally regarded as being a ring or chain polymer typically having two substituents on each phosphorus atom. Most typically the phosphazene is characterized by cyclic trimer, cyclic tetramer and high polymeric structures. It has been suggested that phosphazene be employed for cross-linking hydroxyl terminated liquid polybutadiene compounds and that phosphazene may be employed to provide substitution products in reactions with amines, alcohols and phenols and to activate carboxylic acid.

Limitations in epoxy cured-carboxyl terminated reactive liquid polymer systems relating to ultimate elongation and use at low temperatures would likely make cured amine terminated reactive liquid polymer systems having superior elongation and low temperature characteristics desirable. Rubbery like substances suitable for imparting impact enhancing properties and flame retarding properties alone or in combination with other polymers could find substantial utility.

DISCLOSURE OF THE INVENTION

The present invention provides a cured composition of a amine terminated reactive liquid polymer and a method of making such a composition. The composition is the product of a reaction between a) an amine terminated reactive liquid polymer, and b) a phosphazene. The phosphazene may be either cyclic or straight chained but is possessed of at least three and generally not more than twenty phosphorus atoms and includes at least one amine reactive substituent on at least one of the phosphorus atoms. Preferably the phosphazene is present in the composition in a ratio of between about 0.50 and about 4.0 equivalents per equivalent of liquid polymer and most preferably at between 0.50 and 2.0.

The reactive liquid polymer is characterized by a backbone including at least one polymerized vinylidene monomer selected from a group consisting of: (a) monoolefins having between two and fourteen carbon atoms; (b) dienes having between four and ten carbon atoms; (c) vinyl and allyl esters; (d) vinyl and allyl ethers; and (e) acrylates of the form $CH_2=CH-COOR''$, $R''$ being alkylthioalkyl or cyanoalkyl radical having not more than twelve carbon atoms.

Preferably the amine terminated reactive liquid polymer includes between about 0.005 and 0.20 amine equivalents per hundred weight of liquid polymer and a bulk viscosity of between about 500 and $2.5 \times 10^6$ centipoise (Brookfield).

In preferred embodiments, the reactive liquid polymer backbone comprises 1,4 polybutadiene and between about ten and 35 weight percent acrylonitrile. Typically in these preferred embodiments the phosphazene will be a cyclic trimer or tetramer that includes at least one chlorine substitutent.

The composition is formed by blending together the phosphazene and the reactive liquid polymer. Typically a diluent/solvent will be employed in combining the reactive liquid polymer with the phosphazene for reaction. The rapidity with which the composition cures or sets can be controlled by varying the ratio of phosphazene in the composition, with more elevated phosphazene levels promoting more rapid curing.

The above and other features and advantages of the invention will become more apparent in view of the description of a preferred embodiment which follows and forms a part of the specification.

BEST EMBODIMENT OF THE INVENTION

The present invention provides a composition of matter, the composition of matter being a reaction product of an amine terminated reactive liquid polymer and a phosphazene. The reaction is believed to be characterizable as a cross linking or curing reaction by which the amine terminated reactive liquid polymer achieves elastomeric properties.

The amine-terminated liquid polymers suitable for use in the compositions of this invention have the formula $$Y-\overset{O}{\underset{\|}{C}}-B-\overset{O}{\underset{\|}{C}}-Y$$

wherein Y is a univalent radical obtained by removing a hydrogen from an amine group of an aliphatic, alicyclic (cyclane) or heterocyclic amine containing at least two primary and/or secondary amine groups, and B is a polymeric backbone comprising generally carbon-carbon linkages. Generally the carbon-carbon linkages comprise at least about 95% by weight of total polymeric backbone weight with predominately carbon-oxygen linkages forming any remaining percentage, and may comprise about 100% by weight of total polymeric backbone weight. The amine-terminated polymers contain an average from about 1.5 to about 4 primary and/or secondary amine groups per molecule, more preferably from about 1.7 to about 3 primary and/or secondary amine groups per molecule. Some of these amine groups may be pendant from the backbone, but preferably each backbone is terminated at two end points by such an amine group.

The amine-terminated polymers may have Brookfield viscosities (measured using a Brookfield® RVT viscometer at 27° C.) from about 500 cps. to about 2,500,000 cps., and more preferably from about 500 cps. to about 1,200,000 cps. The amine-terminated liquid polymers may have amine equivalent weights (gram molecular weight per primary and/or secondary amine group, but exclusive of tertiary amine groups) of from about 300 to about 4,000, and more preferably of from about 600 to about 3,000.

The amine-terminated liquid polymers can be prepared easily by reacting a carboxyl-terminated, ester-terminated or acid chloride-terminated liquid polymer having a predominately carbon-carbon linkage backbone with at least one aliphatic, alicyclic, or heterocyclic amine containing at least two primary and/or secondary amine groups.

Any such carboxyl-terminated liquid polymers used to prepare an amine terminated reactive liquid polymer for use herein may have a Brookfield viscosity of from about 500 cps. to about 2,500,000 cps., and more preferably of from about 500 cps. to about 1,200,000 cps., and have a polymeric backbone comprising carbon-carbon linkages. These carboxyl-terminated liquid polymers typically are possessed of a carboxyl equivalent weight (gram molecular weight per carboxyl group) of from about 300 to about 4,000, and more preferably of from about 600 to about 3,000. The carboxyl functional groups are located at least at the ends of a polymer molecule, but there may also be additional group(s) located pendant to the polymer backbone. The average number of carboxyl groups typically may be from about 1.5 to about 4 groups per molecule, more preferably from about 1.7 to 3 groups per molecule.

Carboxyl, hydroxyl or other terminated reactive liquid polymers and the amine terminated reactive liquid polymers employed in this invention having carbon-carbon backbone linkages may contain polymerized units of at least one vinylidene monomer having at least one terminal $CH_2=<$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 atoms such as vinyl methyl ether, allyl methyl ether, and the like; and (e) acrylic acids and acrylates having the formula $$CH_2=\overset{R}{\underset{|}{C}}-\overset{O}{\underset{\|}{C}}-O-R'$$

wherein R is hydrogen or an alkyl radical containing 1 to 3 carbon atoms and R' is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, and more preferably 2 to 8 carbon atoms. R' can be hydrogen or an alkyl radical containing 2 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Frequently two or more types of these polymerized monomeric units are contained in the polymeric backbone.

More preferred amine terminated liquid polymers contain polymerized units of at least one vinylidene monomer having at least one terminal $CH_2=C<$ group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (c) acrylic acids and acrylates having the formula $$CH_2=\overset{R}{\underset{|}{C}}-\overset{O}{\underset{\|}{C}}-O-R'$$

wherein R is hydrogen or an alkyl radical containing 1 to 3 carbon atoms and R' is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. R' can be hydrogen or an alkyl radical containing 1 to 3 carbon atoms. Excellent results are obtained in the practice of this invention with dienes containing 4 to 10 carbon atoms and more preferably 4 to 8 carbon atoms.

The vinylidene monomers described above may be polymerized readily with from 0% up to about 50% by weight and more preferably from 10% up to about 35% by weight, of at least one comonomer selected from the group consisting of (a) vinyl aromatics having the formula

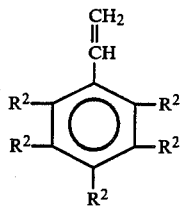

wherein $R_2$ is hydrogen, halogen or an alkyl radical containing from 1 to 4 carbon atoms, such as styrene, α-methyl styrene, chlorostyrene, vinyl toluene, and the like; and (b) vinyl nitriles having the formula

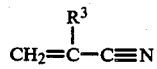

wherein $R^3$ is hydrogen or an alkyl radical containing 1 to 3 carbon atoms, such as acrylonitrile; methacrylonitrile and the like; (c) divinyls and diacrylates such as divinyl benezene, divinyl ether, diethylene glycol diacrylate, and the like; (d) amides of αβ-olefinically unsaturated carboxylic acids containing 2 to 8 carbon atoms such as acrylamide and the like; and (e) allyl alcohol, and the like and (f) mixtures thereof.

More preferred comonomers may be selected from the group consisting of (g) vinyl aromatics having the formula

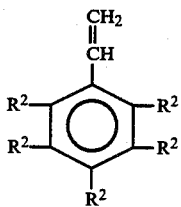

wherein $R^2$ is selected from the group consisting of hydrogen and alkyl radicals containing from 1 to 4 carbon atoms; and (h) vinyl nitriles having the formula

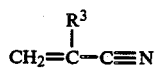

wherein $R^3$ is hydrogen or an alkyl radical containing 1 to 3 carbon atoms and (i) mixtures thereof. Excellent results were obtained employing acrylonitrile.

Examples of useful liquid polymeric backbones comprising carbon-carbon linkages include polyethylene, polyisobutylene, polyisoprene, polybutadiene, poly(vinyl ethyl ether), poly(ethylacrylate), and poly(n-butylacrylate) as well as copolymers of butadiene and acrylonitrile; butadiene and styrene; vinyl acetate and isoprene, vinyl ethyl ester and diallyl ether; vinyl ethyl ether and α-methyl styrene; methyl acrylate and butadiene; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene, ethyl acrylate and butadiene; ethyl acrylate and vinyl acetate; ethyl acrylate and styrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and acrylic acid; ethyl acrylate and acrylamide; ethyl acrylate and allyl alcohol; butyl acrylate, styrene and isoprene; butyl acrylate and styrene; butyl acrylate and acrylonitrile; and the like.

Liquid carboxyl-terminated polymers suitable for conversion to amine terminated polymers for use herein may be prepared by free-radical polymerization using carboxyl-containing initiators and/or modifiers as disclosed in U.S. Pat. No. 3,285,949 and German Patent No. 1,150,205 and by solution polymerization using lithium metal or organo-metallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from hydroxyl-terminated reactive liquid polymers by reaction with dicarboxylic acids or their anhydrides. Halogen-terminated reactive liquid polymers can be reacted with unsaturated anhydrides in the presence of Lewis acids to yield carboxyl groups. Thus, it should be apparent that the method of preparing the carboxyl-terminated reactive liquid polymer is not critical to the invention. The essential features of any such polymer are that it have at least terminal carboxyl groups and a polymeric backbone of principally carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate), as well as carboxyl-terminated copolymers of butadiene and acrylonitrile and of butadiene and styrene. Carboxyl-terminated copolymers of butadiene with acrylonitrile or styrene have been found to be especially useful in the practice of this invention. These polymers may contain from about 50% to about 99% by weight of butadiene, from about 0% to about 40% by weight of acrylonitrile or styrene and from about 1% to about 15% by weight of carboxyl, based upon the total weight of polymer.

Carboxyl-terminated reactive liquid polymers can be esterified with an aliphatic monohydric alcohol by methods well known to the art in order to produce ester-terminated liquid polymers which may be converted to amine terminated polymers in well known manner. For example a carboxyl-terminated polymer and an aliphatic monohydric alcohol can be reacted under reflux in the presence of a small amount of an acid catalyst. Suitable acid catalysts include organic acids such as monoesters and diesters of orthophosphoric acid, alkarylsulfonic acids such as p-toluenesulfonic acid, and the like; inorganic acids such as boric acid, hydrochloric acid, phosphoric acid, sulfuric acid and the like; and Lewis acids such as tetraisopropyl titanate and the like. The amount of acid catalyst used may be as little as about 0.01% up to about 5% by weight based upon total reactant weight. Suitable aliphatic monohydric alcohols for use in the esterification reaction contain from 1 to about 12 carbon atoms, more preferably from 1 to 6 carbon atoms, and having boiling points below about 150° C., more preferably below about 100° C. Primary aliphatic monohydric alcohols are preferred. Examples of suitable aliphatic monohydric alcohols include alkanols containing from 1 to 6 carbon atoms, such as methanol, ethanol, 1-propanol, 1-butanol, 1-pentanol, and the like. Other suitable aliphatic monohydric alcohols include 2-methoxethanol, 2-ethoxyethanol and the like. Excellent results can be obtained using ethanol, 1-propanol or 1-butanol. Excellent results may also be obtained using methanolic or ethanolic diazomethane.

The carboxyl-terminated reactive liquid polymers can be converted to acid chloride-terminated reactive liquid polymers by methods well known to the art which may then be converted to amine terminated reactive liquid polymers in well known manner. For example, a typical carboxyl-terminated reactive liquid polymer can be reacted with thionyl chloride to produce an acid chloride-terminated polymer. HCl and SO$_2$ are evolved primarily as gases and are separated easily from the acid chloride-terminated polymer, and any excess thionyl chloride can be removed easily by vacuum distillation or by washing with a solvent such as dry methyl ethyl ketone or benzene. Other suitable but less preferred acylation agents include phosphorus trichloride and phosphorus pentachloride.

Amines which react well with the carboxyl-terminated, ester-terminated and acid chloride-terminated polymers described heretofore include aliphatic amines containing from 1 to 20 carbon atoms, more preferably from 1 to 12 carbon atoms, and at least two, more preferably two, primary and/or secondary amine groups. Also suitable are alicyclic amines containing from 4 to 20 carbon atoms, more preferably about 4 to 12 carbon atoms and at least two, more preferably two, primary and/or secondary amine groups. Heterocyclic amines may also be used which contain from 2 to 20 carbon atoms, more preferably from 2 to 12 carbon atoms, and at least two, more preferably two, primary and/or secondary amine groups. Examples of suitable amines just described include aliphatic amines such as ethylenediamine, 1,2-propanediamine, 1,4-butanediamine, N-methyl-1,3-propanediamine, 1,5-pentanediamine, 1,6-hexanediamine, 1,7-heptanediamine, 1,8-octanediamine, 1,10-decanediamine, 1,12-dodecanediamine and the like; aliphatic polyamines such as diethylenetriamine, triethylenetetramine, tetraethylenepentamine, bis(hexamethylene) triamine, 3,3'-iminobispropylamine, and the like; alicyclic diamines and polyamines such as 1,2-diaminocyclohexane, 1,8-methanediamine and the like; and heterocyclic diamines and polyamines such as 4,4'-trimethylenedipiperidine; 4-(aminomethyl)piperidine; piperazine; N-(aminoalkyl)piperazines wherein each alkyl group contains from 1 to 12 carbon atoms, more preferably 1 to 6 carbon atoms, such as N-(2-aminoethyl)-piperazine, N-(3-aminopropyl)piperazine, N,N'-bis(aminopropyl)piperazine, and the like.

More preferably these amines contain at least one primary amine group and at least one secondary amine group, and even more preferably one primary and one secondary amine group. Primary and secondary amine groups have different reactivities with a given carboxyl-terminated, ester-terminated or acid chloride-terminated liquid polymer described heretofore. Therefore, the presence of such amine groups having different reactivities makes the amine-termination reaction more likely than coupling of the liquid polymers by the diamine, and a smaller amine excess may be used than would otherwise be required in order to avoid coupling. Examples of more preferred amines include some aliphatic amines such as N-methyl-1,3-propanediamine and the like; and some heterocyclic amines such as 4-(aminomethyl)-piperidine and N-(aminoalkyl)piperazines wherein the alkyl group contains from 1 to 12 carbon atoms, more preferably 1 to 6 carbon atoms, such as N-(2-aminoethyl)-piperazine, N-(3-aminopropyl)-piperazine, and the like. Excellent results were obtained using N-methyl-1,3-propanediamine, 4-(aminomethyl)-piperidine and N-(aminoalkyl)piperazines.

Although aromatic diamines and polyamines can be used to prepare amine-terminated liquid polymers, liquid polymers prepared employing such amines may be less reactive in the practice of this invention.

A solvent is not required for conversion of the reactive liquid polymers to amine terminated reactive liquid polymers but may be used. Mixtures of solvents may also be employed. Suitable such solvents would include aliphatic and cycloaliphatic ethers containing from 3 to 10 carbon atoms, more preferably from 3 to 6 carbon atoms, such as tetrahydrofuran, diethylether and the like, and esters containing from 3 to 10 carbon atoms, more preferably from 3 to 6 carbon atoms, such as ethyl acetate, n-butyl acetate, hexyl acetate, benzyl acetate, methyl propionate, ethyl propionate and the like. Also suitable as solvents and more preferred are aromatic compounds having the formula

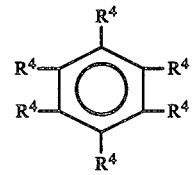

wherein $R^4$ is hydrogen, or an alkyl radical containing from 1 to 3 carbon atoms, and at least two $R^4$s are hydrogen. More preferably $R^4$ is hydrogen or an alkyl radical containing 1 to 2 carbon atoms, and at least three $R^4$'s are hydrogen. Suitable aromatic solvents include benzene, toluene, o-, m- and p-xylene, o-, m- and p-diethylbenzene, cumene, mesitylene and the like.

A sufficient quantity of at least one amine as set forth may be reacted with a carboxyl-terminated, ester-terminated or acid chloride-terminated liquid polymer as set forth in order to produce an amine terminated liquid polymer containing from about 1.5 to about 4 primary and/or secondary amine groups per molecule. Typically the average number of total carboxyl, ester or acid chloride groups in a liquid polymer before reaction will be from about 1.5 to about 4 groups per molecule, more preferably from about 1.7 to about 3 groups per molecule. Typically, from about 1.2 to about 6 moles and more, more preferably from about 1.2 to about 3 moles of at least one amine described heretofore is employed per equivalent of carboxyl-terminated, ester-terminated or acid chloride-terminated liquid polymer described heretofore to effect a conversion to amine termination. However, when the carboxyl-terminated, ester-terminated or acid chloride-terminated liquid polymer also contains appreciable amounts of acrylic acid, acrylates or the like polymerized therein, the amount of amine employed for reaction should be appropriately limited so that the amine-terminated liquid polymer contains no more than an average of 1.5 to about 4 primary and/or secondary amine groups per molecule.

In converting reactive liquid polymers to amine termination, no catalyst is required, and many types of mixing apparatus can be used in the amine termination reaction. For example, simple mixers can be used, including turbine stirrers as well as propeller mixers. Reaction components can be combined in any order. The reaction mixture may be heated (or refluxed if a solvent is used) at a temperature from about 80° C. to about 200° C., until more than 90% of any carboxyl, ester or acid chloride groups have reacted with the amines, i.e., until the amidation reaction is more than 90% complete. Reaction time is typically about 1 to 120 hours. By-products may be removed by evaporation or the like as they are formed (e.g. water from a carboxylamine reaction, HCl from the acid chloride-amine reaction, and alcohol from the ester-amine reaction). The resulting amine-terminated liquid polymer may be purified by vacuum distillation or by washing with a solvent such as a benzene-methanol mixture in order to remove the unreacted amine, followed by drying of the polymer. The structure of amide formed during preparation of the amine terminated liquid polymers can be determined by infrared spectroscopy. Amine value can be analyzed quantitatively following the procedure described by Siggia, *Quantitative Organic Analysis via Functional Groups*, N. Y., Wiley and Sons, Inc. 1963, pp. 452–456, using a toluene/isopropanol solvent mixture instead of Siggia's ethylene glycol/isopropanol mixture.

Particularly, an amine terminated reactive liquid polymer having the form:

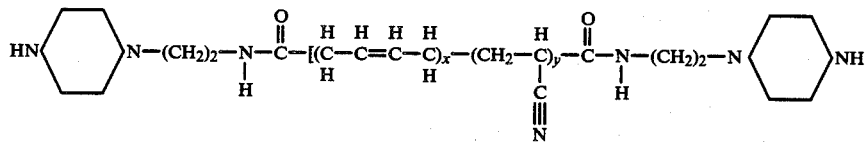

is preferred in the practice of the instant invention. X may be 1–10, Y may be 0–5, and M may be 1–50. Such a material is available from The BFGoodrich Company as HYCAR ATBN (1300×16).

The phosphazene may be any suitable or conventional ring or chain polymer containing alternate phosphorus and nitrogen atoms and having two substituents on each phosphorus atom. Preferred are cyclic trimers and cyclic tetramers and polymers in which the number of phosphorus atoms does not exceed 20. Preferably the phosphazene contains at least three phosphorus atoms.

The substituents on a phosphazene suitable for use in the practice of the instant invention may be selected from a wide variety of organic groups, halogens, alkylhalides, acyl halides, acid anhydrides, acid esters, amino groups and the like. At least one such substituent should be amine reactive thereby facilitating reaction between the phosphazene and the reactive liquid polymer. Much preferred is the substituent chlorine.

Not all substituents associated with the phosphazene need be amine reactive. The presence of amine non-reactive substituents at selected sites upon the phosphazene can produce a reaction product between the phosphazene and the reactive liquid polymer in which cross-linking therebetween is appropriately restricted. Examples of such so-called blocking groups would include: straight chain, branched, unsaturated, cyclic, and arylic aminos, particularly $N(CH_3)_2$, $NH_2$, $NHCH_3$, $NHC_6H_5$, $HN-CH_2CH=CH_2$, $(CH_3CH_2)NH_2$, $(CH_3CH_2)_2NH$, $CH_3CH_2CH_2NH_2$, $(CH_3CH_2CH_2)_2NH$, $C_4H_9NH_2$, $(C_4H_9)_2 NH$, piperidino, morpholino, and pyrrolidino; phenoxy or aryloxy such as $OC_6H_5$, $OC_6H_4CH_3$, meta $CF_3C_6H_4O$, meta $FC_6H_4O$, meta $CF_3OC_6H_4$ $NO_2C_6H_4$ and para $CH_3OC_6H_4O$; fluoralkoxy such as $OCH_2 CzF_{2z+1}$ (1–z–3), $OCH_2 (CF_2)_y H$ (y–10 and even), and $OCH(CF_3)_2$; ethyleneimine; pyrolle; alkoxy such as $OCH_3$, $OC_2 H_5$, $OC(CH_3)_2H$, $OC_4H_9$, $OCH_2C_6H_5$; $OC_3H_7$, and $OCH_2CH=CH_2$; amino acid esters such as $NH_2CH_2COOC_2H_5$ and $NH_2CH_2CH_2COOC_2H_5$; isothiocyano such as NCS; alkylthio such as $C_2H_5S$, $C_3H_7S$, and $C_4H_9S$; arylthio such as $C_6H_5S$, and $C_6H_5CH_2S$; and, aryl and alkyl having less than about 18 carbon atoms such as $CH_3$, $C_2H_5$, $C_4H_9$, $CF_3$, $C_3F_7$, $C_6H_5$, and $C_6H_4CH_3$.

A blocking group may also provide additional desirable properties to the reaction product of the phosphazene and the reactive liquid polymer. For example, use of an amino as a blocking group can provide hydroscopic properties, solubility in $H_2O$, and pharmacological compatability; use of phenoxies can provide thermal stability; use of a fluroalkoxy can provide ultra violet light stability, soil repellancy, thermal stability and chemical resistance; and use of aryl and alkyl can provide thermal stability; the phosphazene ring itself can impart flame retardency by virtue of the phosphorous and nitrogen present in the compound together with any halogen substituents.

There is no requirement that a particular phosphazene compound be used exclusively in a reaction with a reactive liquid polymer. Mixtures of phosphazene compounds may be employed to produce a desirable reaction product having a desirable cure time and demonstrating the effects of the presence of a desirable blocking substituent thereon. For example, mixtures of $P_3N_3Cl_6$ and $P_3N_3Cl_2(OPh)_4$ may be employed to provide a reaction product having thermal stability properties while curing relatively rapidly. By adjusting the ratio of the phosphazene compound employed, curing can be speeded or retarded, with an elevated proportion of $P_3N_3Cl_6$ providing generally a more rapid cure.

Phosphazenes are commercially well known and may be obtained from sources associated with The Firestone Tire & Rubber Company.

EXAMPLE 1

A first mixture of 2.7 grams of hexachlorocyclotriphosphazene which had been recrystalized from ligroin according to well known procedure and 15 milliliters of dichloromethane was prepared. A second mixture of 57.43 grams of HYCAR ATBN 1300×21 (an amine terminated reactive liquid butadiene/acrylonitrile copolymer commercially available from The BFGoodrich Company) and 35 milliliters of $CH_2Cl_2$ was prepared. The HYCAR 1300×21 material was possessed of an amine equivalent weight of 1230. The two mixtures were combined under agitation and hand stirred for approximately one minute at 22° C. and then poured into a mold lined with MYLAR ®, the mold measuring 6"×6" by 0.075". The reacted mixtures were permitted to stand at room temperatures for approximately one minutes to vent residual dichloromethane. A covering sheet of MYLAR was then applied and the mold was closed and minimum pressure applied. During the first five minutes of minimum pressure, the mold temperature was permitted to rise to approximately 100° F. The mold was then put under 40,000 pounds per square inch (p.s.i.) for approximately 40 minutes during which time the mold temperature was permitted to rise to approximately 200° F. The mold was then cooled under pressure and the cured sheet removed. The resulting polymer is a pale yellow translucent, flexible sheet.

Separately the HYCAR material and Epon 828 (an epoxy available from Shell Oil Company) were combined in a ratio of 300/100 phr; Epon® 828 being a typical epoxy curing agent for HYCAR 1300×21 and formed into a sheet under heat and pressure.

This epoxy cured HYCAR material and the reaction product between the HYCAR (1300×21) material and phosphazene were tested to determine selected physical properties which are set forth in Table I.

TABLE I

|  | Epoxy (Epon 828) Cured HYCAR | Phosphazene Cured HYCAR |
|---|---|---|
| 100% Modulus; M Pascal | — | 1.97 |
| Tensile Strength: M Pascal | 4.8 | 4.35 |
| Ultimate Elongation, % | 94 | 288 |
| Gehman Freeze Pt; °C. | −49.5 | −66 |
| Compression Set, % | 80.2 (−100° C.) | 87.6 (75° C.) |
| Tear Resistance, K Newton Meter | 13.9 | 9.5 |

It is important to note that the amine terminated HYCAR (1300×21) reactive liquid polymer cured with phosphazene possesses an ultimate elongation parameter roughly three times that of the same reactive liquid polymer cured employing an epoxy. Also phosphazene cured reactive liquid polymer appears to be possessed to a Gehman freeze point significantly lower than that for epoxy cured reactive liquid polymer. It is also important to note that where reactive liquid polymers such as HYCAR 1300×21 have been prepared by reacting a dicarboxylbutadiene/acrylonitrile copolymer with amino ethyl piperazine as is done to prepare HYCAR (1300×21), residual amino ethyl piperazine in the reactive liquid polymer functions to accept hydrogen chloride evolved from the reaction between the phosphazene and the reactive liquid polymer thereby assisting the kineticis of such reaction and neutralizing evolving hydrogen chloride.

EXAMPLE 2

2.0 grams of $P_3N_3Cl_2[(CH_3)_2CHNH_2]_4$ is dissolved in 5 milliliters of dichloromethane. The resulting solution is added in a single portion to a dichloromethane solution of HYCAR (1300×21) formed by the admixture of 20.8 grams of the HYCAR (1300×21) in 25 milliliters of dichloromethane and 1 milliliter of triethlylene. The solutions were combined at 22° C. and after approximately six days a rubbery elastomeric material resulted.

EXAMPLE 3

20.8 grams of HYCAR (1300×21) were combined with 2.5 grams of triethylamine. 2.5 grams of $P_3N_3Cl_2(OPh)_4$ were added to the mixture and the mixture was then heated to 85° C. The viscosity of the mixture increased steadily until after approximately two hours at 85° C, a rubbery solid resulted. This rubbery solid swells in dichloromethane, trichloromethane and tetrahydrofuran but does not dissolve in these substances. Infared analysis of the rubbery material does not indicate the presence of phosphorus-chlorine bonds, indicating the original $P_3N_3Cl_2(OPh)_4$ to have reacted with amine terminal groups of the HYCAR (1300×21). The reaction is repeated in 25 milliliters of trichloromethane with identical results. It should be noted that the tetra-phenoxy-phosphazene employed contained minor amounts of penta-phenoxy-phosphazene and tri-phenoxy-phosphazene.

EXAMPLE 3

Example 2 was repeated except employing 1.67 grams of $P_3N_3Cl_2(OPh)_4$. A putty like material resulted.

EXAMPLE 4

10.4 grams of HYCAR (1300×16) reactive liquid polymer, 2.5 milliliters of triethylamine and 5 grams $P_3N_3Cl_2(OPh)_4$ were combined and heated for one hour at 85° C. and then allowed to stand at 22° C. for five days. A rubbery polymeric substance resulted having obvious adhesive properties. The resulting material was stretchable into a film and was found to be soluble in acetone, toluene, tetrahydrofuran, and dichloromethane. The resulting substance was found to be insoluble in water and hexane, and the equivalent weight of the material was found to be 9210; the molecular weight was found to be 16,800.

It should be apparent then, that employing a partially substituted phosphazene, limitation upon the extent of cross-linking achieved in curing a reactive liquid polymer may be accomplished. Limitations upon the extent of cross-linking can produce a polymeric substance that is soluble in an organic and can therefore be solvent cast into films. Another advantage associated with employing phosphazene partially substituted with blocking groups can lie in making resulting polymers less hydroscopic since unreacted phosphorous chlorine bonds within the cured polymer would tend to promote hydrolysis of the polymer.

EXAMPLE 5

1.01 grams of $P_3N_3Cl_2(OPh)_4$ and 0.25 grams of P were dissolved in five milliliters of dichloromethane. The dichloromethane solution was combined with 10.8 grams of HYCAR (1300×16) and the combination was stirred by hand for approximately two minutes at 22° C. After two minutes, the system had gelled, that is was no longer stirable, to produce a rubbery polymeric material.

EXAMPLE 6

Example 5 was repeated except employing 1.52 grams of $P_3N_3Cl_2(OPh)_4$ and 0.13 grams of $P_3N_3Cl_6$. Under agitation at 22° C. the system had a gell time of approximately 1 hour.

EXAMPLE 7

Example 6 was repeated except employing 1.83 grams of $P_3N_3Cl_2(OPh)_4$ and 0.051 grams of $P_3N_3Cl_6$. At 22° C. the gell time was extended to approximately 7 days to produce a rubbery polymeric substance.

EXAMPLE 8

Reaction products of the amine terminated reactive liquid polymer of Example 1 and hexachlorocyclotriphosphazene were prepared by blending the reactants in accordance with Example 1 (solvents proportionately reduced on a weight basis) in accordance with the relative weights shown in Table II and with the resulting gel times shown in table II.

TABLE II

| Sample # | Grams ATBN | Grams (PNCl$_2$)$_3$ | Ratio* (PNCl$_2$)$_3$ ATBN | Gel** Time (Min) |
|---|---|---|---|---|
| 1 | 25.0 | 1.906 | 1.5 | 6 |
| 2 | 25.0 | 1.27 | 1.0 | 5-6 |
| 3 | 20.0 | 0.762 | 0.75 | 9 |
| 4 | 25.0 | 0.635 | 0.50 | 39 |
| 5 | 20.0 | 4.57 | 4.5 | 45 |
| 6 | 20.0 | 3.05 | 3.0 | 75 |

*Equivalent ratio [(PNCl$_2$)$_3$ = 57.95 grams per equiv.; ATBN = 1140 grams per equiv.
**@ 22° C.

From Table II it is apparent that large excesses or shortfalls of (PNCl$_2$)$_3$ retard gel time while more rapid gel times are achieved with a ratio of (PNCl$_2$)$_3$/ATBN of between about ½-2.0.

The reaction products of Table II were subjected to weight loss determination, the results being displayed in Table III which displays thermal gravimetric analysis results obtained under N$_2$.

TABLE III

| Sample # | Temp °C. For 1% Wt. Loss | Temp °C. For 5% Wt. Loss | Temp °C. For 99% Wt. Loss |
|---|---|---|---|
| HYCAR ATBN 1300 × 21 | 180 | 300 | 520 |
| 1 | 260 | 340 | >1000 |
| 2 | — | — | — |
| 3 | 240 | 350 | 510 |
| 4 | 170 | 340 | 515 |
| 5 | 150 | 250 | >1000 |
| 6 | 170 | 320 | >1000 |

Samples 1, 3-4 were found to swell modestly in CH$_2$Cl$_2$, tetrahydrofuran (THF) ligroine and N-methyl-2-pyrrolidone (NM2P). Sample 6 partially dissolved in THF, but swelled in CH$_2$Cl$_2$, ligroine, and NM2P. Sample 5 dissolved extensively in THF, CH$_2$Cl$_2$ and NM2P, swelling in ligroine.

It should be apparent that in the practice of the instant invention it is much preferred that the reactive liquid polymer be an amine terminated reactive liquid polymer derived from a butadiene acrylonitrile copolymer. One factor impacting upon the preference for such a reactive liquid polymer is the relatively ready available of such polymers commercially. Nonetheless, it is emphasized that other suitable or conventional amine terminated reactive liquid polymers as discussed herein can provide the desirable inventive polymeric reaction products with phosphazenes.

It should be apparent that reaction products of reactive liquid polymers and phosphazenes can be prepared by merely combining the phosphazene and the reactive liquid polymer. Such a simple preparational procedure for the combination is facilitated by the reactive liquid polymer generally being in a liquid state and therefore readily amenable to admixture with a phosphazene. It should be noted that it is much preferred that the reactants be agitated until reaching a gell state so as to promote uniform and reliable cross-linking. Nonetheless, agitation may be discontinued before a full gell state is achieved so that the reactive liquid polymer, prior to achieving a full cure, can be cast or formed into a desired shape. It is important to note that elevated temperatures can promote a more rapid gel or cure, but that room temperature curing is readily achievable. Room temperature curing permits use of the reaction products of the instant invention in adhering objects one to the next and in effecting repairs to elastomeric membranes and the like. In addition, the reaction products of the instant invention find utility as additives to unfilled polypropylene, polyethylene, and other elastomeric materials. As blended additives, the reaction products of this invention have been found to function to significantly reduce the tendency for polypropylene, polyethylene and the like to drip when exposed to open flame and to reduce the susceptibility of such polymers to ignition.

Because the reaction product of the instant invention provides significant rubbery or elastomeric properties at temperatures substantially below 0° C. the reaction products of the instant invention can be formed into elastomeric structures which are required to maintain elastic performance at such temperatures. Yet the reaction products of the instant invention, notwithstanding the inclusion of low temperature elastomeric properties, demonstrate a substantial resistance to weight loss at temperatures in excess of 350° F. Thus, such reaction products can provide a broad range of desirable elastomeric performance under conditions of substantially varying temperature.

Therefore, while a preferred embodiment of the invention has been shown and described in detail, it should be apparent that various modifications and alterations can be made thereto without departing from the scope of the claims that follow:

What is claimed is:

1. A composition of matter comprising: a reaction product of (a) an amine terminated reactive liquid polymer and (b) a phosphazene; the phosphazene being one of cyclical or straight chained having at least 3 but not more than 20 phosphorous atoms and including at least one amine reactive phosphorous substituent, the reactive liquid polymer having a backbone including at least one polymerized vinylidene monomer selected from a group consisting of: (a) monoolefins having between 2 and 14 carbon atoms; (b) dienes having between 4 and 10 carbon atoms; (c) vinyl and allyl esters; (d) vinyl and allyl ethers and (e) acrylates of the form CH$_2$=CH-COOR″, R″ being: hydrogen, an alkyl radical of not more than 18 carbon atoms, or an alkoxyalkyl, alkylthioalkyl or cyanoalkyl radical having not more than 12 carbon atoms.

2. The composition of claim 1, the reactive liquid polymer having between about 0.005 and 0.20 amine equivalents per liquid polymer hundred weight and a bulk viscosity of between about 500 and 2.5×10$^6$ centipoise (Brookfield), the reactive liquid polymer being selected from a group consisting of polyethylene, polyisobutylene, polybutadiene, polyisoprene, poly(butadieneacrylonitrile), poly(butadiene-styrene), poly(ethyl acrylate), poly(ethyl acrylate-n-butyl acrylate), poly(n-butyl acrylate-acrylonitrile), poly(butyl acrylate-styrene) and poly(butadiene-acrylonitrileacrylic acid), any polybutadiene in said liquid polymer backbone being substantially 1,4-polybutadiene; the phosphazene being present in the composition in a ratio of betweeen 0.50 and 4.0 equivalents per equivalent of reactive liquid polymer.

3. The composition of claim 2, the liquid polymer having an average 1.5 to 4.0 amine groups per molecule and the polymeric backbone consisting exclusively of carbon to carbon linkages.

4. The composition of claim 1, the reactive liquid polymer backbone comprising 1,4 polybutadiene and 0 to about 50 weight percent of at least one comonomer selected from the group consisting of (a) vinyl aromatics having the formula

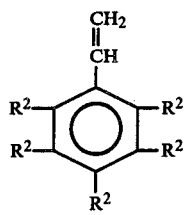

wherein $R^2$ is hydrogen, halogen or an alkyl radical containing from 1 to 4 carbon atoms (b) vinyl nitriles having the formula

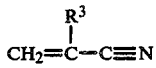

wherein $R^3$ is hydrogen or an alkyl radical containing 1 to 3 carbon atoms (c) divinyls and diacrylates (d) amides of $\alpha,\beta$-olefinically unsaturated carboxylic acids containing 2 to 8 carbon atoms (e) allyl alcohol; and (f) mixtures thereof, the phosphazene being present in the conpositions in a ratio of between 0.50 and 4.0 equivalents per equivalent of liquid polymer.

5. The composition of claim 4, the reactive liquid polymer comprising between about 15 and about 30 weight percent acrylonitrile.

6. The composition of claim 2, the phosphazehe being a cyclic tri or tetramer and having at least one chlorine substituent.

7. A method for curing an amine terminated reactive liquid polymer having a backbone including at least one polymerized vinylidene monomer selected from a group consisting of: (a) monoolefins having between 2 and 14 carbon atoms; (b) dienes having between 4 and 10 carbon atoms; (c) vinyl and allyl esters; (d) vinyl and allyl ethers and (e) acrylates of the form $CH_2=CH-COOR''$, $R''$ being; hydrogen, an alkyl radical of not more than 18 carbon atoms, and an alkoxyalkyl, alkylthioalkyl or cyanoalkyl radical having not more than 12 carbon atoms, and e) mixtures thereof, the vinylidene monomers being polymerized with from 0% to about 50% by weight, of at least one comonomer selected from the group consisting of (a) vinyl aromatics having the formula

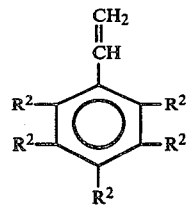

wherein $R^2$ is hydrogen, halogen or an alkyl radical containing from 1 to 4 carbon atoms (b) vinyl nitriles having the formula

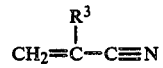

wherein $R^3$ is hydrogen or an alkyl radical containing 1 to 3 carbon atoms (c) divinyls and diacrylates (d) amides of $\alpha,\beta$-olefinically unsaturated carboxylic acids containing 2 to 8 carbon atoms (e) allyl alcohol; and (f) mixtures thereof, comprising the steps of: combining the liquid polymer with a phosphazene having at least 3 and not more than 20 phosphorous atoms, the phosphazene being one of cyclical or straight chained and having at least one amine reactive substituent.

8. The method of claim 7, the liquid polymer having between about 0.005 and 0.20 amine equivalents per liquid polymer hundred weight and a bulk viscosity of between about 500 and $2.5 \times 10^6$ centipoises (Brookfield), the reactive liquid polymer being selected from a group consisting of polyethylene, polyisobutylene, polybutadiene, polyisoprene, poly(butadiene-acrylonitrile), poly(butadiene-styrene), poly(ethyl acrylate), poly(ethyl acrylate-n-butyl acrylate), poly(n-butyl acrylate-acrylonitrile), poly(butyl acrylate-styrene) and poly(butadiene-acrylonitrile-acrylic acid), any polybutadiene in said liquid polymer backbone being substantially 1,4-polybutadiene; the phosphazene being present in the cured reactive liquid polymer in a ratio of between 0.50 and 2.0 equivalents per equivalent of reactive liquid polymer.

9. The method of claim 7, the phosphazene being one of a trimer or a tetramer having at least one chlorine substituent.

10. The method of claim 8, the phosphazene being one of a trimer and a tetramer having at least one chlorine substituent.

11. The method of claim 7, the liquid polymer having an average 1.5 to 4.0 amine groups per molecule and a polymeric backbone comprising 1,4 polybutadiene and 10 to about 35 weight percent acrylonitrile, the phosphazene being present in the cured reactive liquid polymer in a ratio of between 0.50 and 4.0 equivalents per equivalent of liquid polymer.

12. The method of claim 9, the liquid polymer having an average 1.5 to 4.0 amine groups per molecule and a polymeric backbone comprising 1,4 polybutadiene and 10 to about 35 weight percent acrylonitrile, the phosphazene being present in the composition in a ratio of between 0.50 and 4.0 equivalents per equivalent of liquid polymer.

13. The method of claim 11, the liquid polymer comprising between about 15 and about 30 weight percent acrylonitrile.

14. The method of claim 12, the liquid polymer comprising between about 15 and about 30 weight percent acrylonitrile.

* * * * *

UNITED STATES PATENT AND TRADEMARK OFFICE
CERTIFICATE OF CORRECTION

PATENT NO. : 4,535,147
DATED : August 13, 1985
INVENTOR(S) : RONALD E. MYERS

It is certified that error appears in the above-identified patent and that said Letters Patent are hereby corrected as shown below:

Column 2, line 34 after the word "being" add the following:

--hydrogen, an alkyl radical of not more than eighteen carbon atoms, and an alkoxyalkyl--.

Signed and Sealed this

Twenty-first Day of October, 1986

[SEAL]

Attest:

DONALD J. QUIGG

Attesting Officer

Commissioner of Patents and Trademarks